Figure 1:
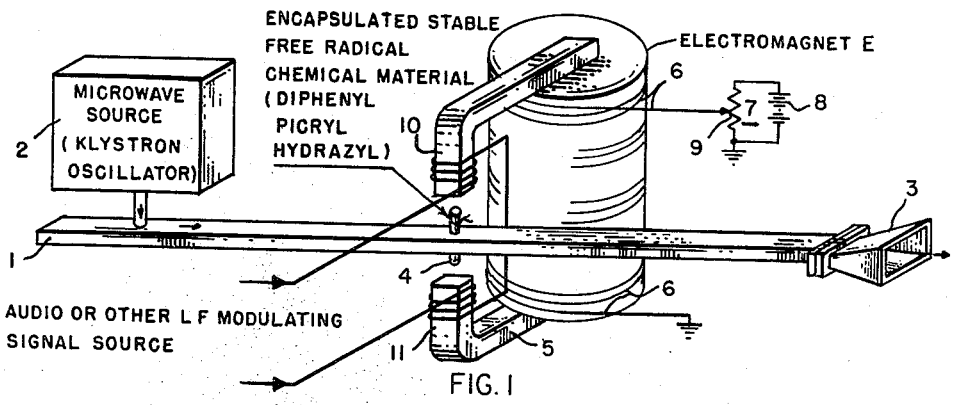

Aug. 30, 1960

H. A. BOMKE ET AL 2,951,214

MICROWAVE MODULATION SYSTEM

Filed Sept. 23, 1957

INVENTORS,
HANS A. BOMKE
BY GEORGE H. MINNERLY
JOHN W. MOUNT

*Harry M. Saragovitz*
ATTORNEY.

United States Patent Office 2,951,214
Patented Aug. 30, 1960

2,951,214

MICROWAVE MODULATION SYSTEM

Hans A. Bomke, Sea Girt, George H. Minnerly, Spring Lake, and John W. Mount, Long Branch, N.J., assignors to the United States of America as represented by the Secretary of the Army Filed Sept. 23, 1957, Ser. No. 685,760

3 Claims. (Cl. 332—51)

(Granted under Title 35, U.S. Code (1952), sec. 266)

The invention described herein may be manufactured and used by or for the Government for governmental purposes, without the payment of any royalty thereon.

The invention relates to wave modulating systems and apparatus and particularly to such systems and apparatus especially adapted for use in high frequency transmission systems, for example, in a microwave communication system.

A general object of the invention is to improve such modulation systems and apparatus from the standpoints of efficiency and economy.

A more specific object is to produce efficiently and economically the modulation of a high frequency carrier, such as a microwave, with signals comprising a wide band of low frequencies, such as speech or other signals in the audio or adjacent frequency ranges.

The invention is specifically directed to modulation systems or apparatus in which the modulating element includes a solid state chemical substance exhibiting an effect due to free nuclear induction, known as nuclear "spin" or paramagnetic resonance absorption, when its atomic nuclei are subjected to a strong, unidirectional magnetic field.

The phenomenon of free nuclear induction per se is discussed in the U.S. patent to F. Bloch et al., No. 2,561,489, issued July 24, 1951, and its pertinent features are briefly described below. Nuclear induction is a magnetic effect based on a combination of mechanical and magnetic properties inherent in each atomic nucleus of certain chemical substances. The mechanical property is that of spin about its axis of symmetry. As the nucleus has mass, it possesses angular momentum of spin and forms a gyroscope, infinitely small, having the normal mechanical properties of such a device. Also, each atomic nucleus has a magnetic moment directed along its gyroscope axis, and may be visualized as a minute bar magnet adapted to spin on its longitudinal axis. For a given chemical substance, a fixed ratio, termed the gyromagnetic ratio usually designated by the Greek letter $\nu$, exists between the magnetic moment of each nucleus and its angular momentum of spin.

A given sample of such a chemical substance contains a large number of gyroscopic nuclei, and the placing of the sample in a strong unidirectional magnetic field will result in its component atomic nuclei, under the influence of the field, aligning themselves so that their magnetic axes are parallel to that field. The alignment of the nuclear magnetic moments in the sample is a matter of chance some of them being aligned with and others against the field. Therefore, the effects of a number of the magnetic moments aligned in one direction will be effectively cancelled by those of an equivalent number aligned in the opposite direction, but usually there will be a preponderance of the magnetic moments aligned in one of the directions so that the sample due to the magnetic field will acquire a net magnetic moment $M_0$ and a net angular momentum $I_0$, which may be represented as the vector sums of the magnetic moments and spins of all the nuclei in the sample. If then, a force is applied to the sample such as to tip these gyroscopic nuclei out of parallel alignment with the main magnetic field, when this force is released these nuclei will tend to return toward parallel alignment with that field due to its effect, with the result that they will rotate or precess about the field direction in the usual gyroscopic manner. This precession will occur at a radian frequency $$\omega_0 = \nu H_0 \qquad (1)$$

where $H_0$ is the field strength affecting each nucleus. Since for any given type of nucleus, $\nu$ is a constant, it is seen that the precessional frequency $\omega_0$, which is termed the Larmor frequency, is a direct function of the field strength affecting that nucleus, and that if the field strength $H_0$ differs in different parts of a sample the groups of nuclei in these parts will exhibit net magnetic moments precessing at different Larmor frequencies.

The book entitled "Spectroscopy at Radio and Microwave Frequencies" by D. J. E. Ingram, published by Butterworths Scientific Publications, London, England, in 1955, includes a fairly complete summary and analysis of the work which had been carried on by various groups of research workers prior to that date in the field of microwave absorption in both gaseous and solid state chemical substances, including paramagnetic resonance absorption in which the energy levels of the paramagnetic ions existing in the crystalline lattice were investigated. Paramagnetic ions were chosen for particular study by these workers because it is possible to vary their energy levels by the application thereto of an external magnetic field, and hence the splitting of the energy levels can be adjusted to cause absorption of the particular microwave frequency being employed. This book gives a brief outline of the theory underlying "spin" paramagnetic resonance, portions of which are repeated below in order to clarify the description of operation of the modulation systems of the invention utilizing this phenomenon.

As stated by Ingram, "The very strong electric fields existing inside a crystalline lattice act on the energy levels of a free paramagnetic ion to remove most of their orbital degeneracy. In many cases, a single level, two-fold degenerate in electron spin is left as the ground state, with all the other levels about $10^4$ cm.$^{-1}$ higher. As the splitting to these other levels is so large, only the ground state is populated at ordinary temperatures, and this may then be resolved into its two components by applying an external magnetic field. The separation between the two levels is then given by $g\beta H$, where $\beta$ is the Bohr magneton, $H$ is the value of the magnetic field and $g$ is known as the "spectroscopic splitting factor," and would be equal to 2.0 if the electron was completely free. If this splitting is now adjusted, by variation of the magnetic field strength, to be equal to the energy of a quantum of the microwave radiation, then the radiation will be absorbed and more spins extracted to the higher state. Hence, the condition for absorbing resonance becomes $$h\nu = g\beta H \qquad (2)$$

(where $h$ is a universal constant known as Planck's constant and $\nu$ is the frequency of the radiation). "Generally speaking paramagnetic resonance can take place whenever there is an electron present in the system which has an unpaired spin. In any full, closed shell of electrons, the orbital and spin angular moments of the individual electrons will all cancel out to give a zero resultant and produce a diamagnetic substance, no electron being left over with uncompensated momentum."

"Paramagnetic resonance in free radicals is due to the odd unpaired electrons which are associated with these particular structures. Unlike the normal uncompensated electrons of paramagnetic ions, these free radicals are associated with the valence electrons and a modification of the normal chemical binding. Nuclear paramagnetic resonance is closely analogous to electron magnetic resonance as in both cases the splitting of the energy levels is produced by the orientation of the magnetic moments in an applied magnetic field; and the magnitude of the splitting is proportional to the strength of the applied field. In both cases also, the absorption lines are usually obtained by keeping the frequency of the radiation constant and varying the strength of the magnetic field. The condition for resonance in the nuclear case, therefore, is similar to that of Equation 2 for electron resonance, except that the electronic magnetic moment and $g$-value are replaced by the corresponding nuclear coefficients, i.e.

$$h\nu = g_1 \cdot \beta_N \cdot H \qquad (3)$$

where $g_1$ is the nuclear $g$-factor and $\beta_N$ is the nuclear magneton. Since the latter is about two thousand times smaller than the Bohr magneton, and the $g_1$ of the proton is about twice that of the electron, it follows that the frequency of the radiation which will produce resonance absorption in a given magnetic field will be about a thousand times smaller than for electron resonance."

As set forth in the Ingram book referred to, various groups of research workers have discovered that certain organic substances with free radical groups display unusually sharp microwave resonance lines with a $g$-value very close to that of free electron spin, and hence signals of strong intensity can be obtained from small amounts of these substances (e.g. diphenyl picryl hydrazyl gives an easily detectable signal from a tenth of a microgram of the substance in a simple crystal-video spectroscope). Detailed reports on the work of these research workers in connection with paramagnetic "spin" resonance absorption on the above-mentioned and other free radical chemical compounds is found in the literature, for example, in articles by Holden, Kittel, Merritt and Yager [Phys. Rev. 75 (1949) 1614 and 77 (1950) 148]; Townes and Turkevitch [Phys. Rev. 77 (1950) 148]; Kiruchi and Cohen [Phys. Rev. 93 (1954) 34]; Singer and Spencer [Jour. Chem. Phys. 21 (1953) 1939]; and Garsten, Singer and Ryan [Phys. Rev. 96 (1954) 53].

The "spin" resonance absorption properties of such paramagnetic free radical types of chemical compounds have been used heretofore to provide efficient energy translation characteristics other than modulation to microwaves. For example, one prior art patent (Dicke 2,762,871) discloses that a paramagnetic organic free radical solid material, such as alpha-alpha-diphenyl-hydrazine, when subjected to a unidirectional magnetic field having a flux density of about 3000 gauss will exhibit resonance at a frequency of the order of $10^{10}$ cycles per second and will operate as an efficient amplifier of microwave energy impressed on the material through a waveguide. Also, an article in a publication ("Electronic Equipment" of March 1955, page 10) states that an efficient solid-state microwave oscillator has been developed, which utilizes the electron "spin" resonant effect of a single crystal of solid-state material comprising one of a group of ionically-bound organic salts, for example, gadolinium ethyl sulphate, when subjected to a unidirectional magnetic field of suitable strength.

The applicants have found that very efficient modulation of a high frequency carrier, such as a microwave, with signals comprising a wide band of low frequencies, such as speech or other signals in the audio and adjacent low frequency ranges, can be obtained by a modulation device including in the modulating element a small quantity of a stable free radical type of chemical compound, such as diphenyl picryl hydrazyl, having an atomic resonance spectrum including a strong sharp resonance absorption line at a particular wavelength. In one embodiment, a small quantity of the material, diphenyl picryl hydrazyl, is encapsulated in a dielectric, and the entire encapsulated structure is disposed transversely across the interior of a non-resonant waveguide structure propagating the microwave or other high frequency carrier wave to be modulated. An initially constant D.-C. magnetic field of predetermined value is applied across this encapsulated free radical material by a permanent magnet or an electromagnet supplied with direct current, in a direction at right angles to the direction of propagation of the microwave or other high frequency carrier wave over the waveguide. The strength of the D.-C. magnetic field is critical, it being made of such value as to bring the free radical compound to resonance due to "spin" paramagnetic resonance absorption at a prescribed frequency which is determined by the characteristics of the free radical compound used and the order of strength of the applied D.-C. magnetic field. A sinusoidally alternating magnetic field produced by varying amplitude signals consisting of a wide band of low frequency components, such as speech or other signals in the audio or adjacent frequency ranges, to be modulated on the microwave carrier, is superposed on the D.-C. magnetic field by means of Helmholtz coils or other suitable electromagnet disposed externally to the waveguide and fed with these signals. The D.-C. magnetic field is thereby modified in accordance with the varying instantaneous amplitudes of the applied sinusoidal modulation voltage to affect the spin velocity of the atomic nuclei in the paramagnetic free radical chemical material (DPPH) in such manner that the microwave carrier propagated over the waveguide and impressed on the encapsulated structure will be modulated therein with the low frequency signals.

In another embodiment of the invention, the encapsulated structure containing the stable free radical material, such as diphenyl picryl hydrazyl, is disposed transversely across the interior of a tuned resonant cavity in the waveguide propagating the microwave carrier energy, in which case the critical frequency for bringing the encapsulated material to resonance is mainly determined by the parameters of the resonant cavity used at the prescribed frequency. A feature of this embodiment is the use in the resonant cavity of A.-C. short-circuiting means, such as a plate at one of its ends to provide a reflecting surface for reflecting the produced signal-modulated microwave carrier back through the cavity and the associated waveguide structure to an antenna. This antenna radiates the received wave to a receiving point where a crystal or other ordinary detector may be used for demodulating the speech, audio or other low frequency signals from the microwave carrier in well known manner.

The advantages of the modulation systems of the invention as briefly described above are that they overcome some of the defects of the prior art microwave modulation systems, and with a relatively simple and economical device provide an ease, rapidity and fidelity of modulation which is equal to that of other much more complicated microwave modulation devices in the prior art, and which is substantially noise free.

Figure 2:
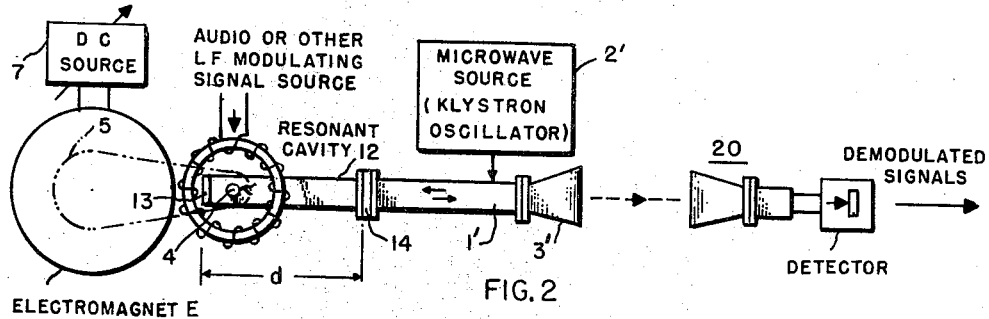
Figure 3:
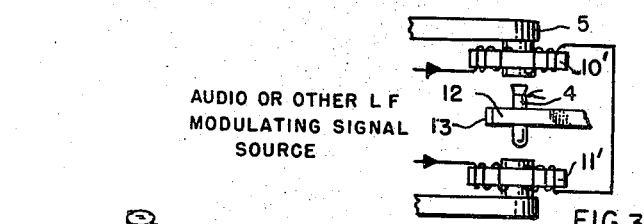
Figure 4:
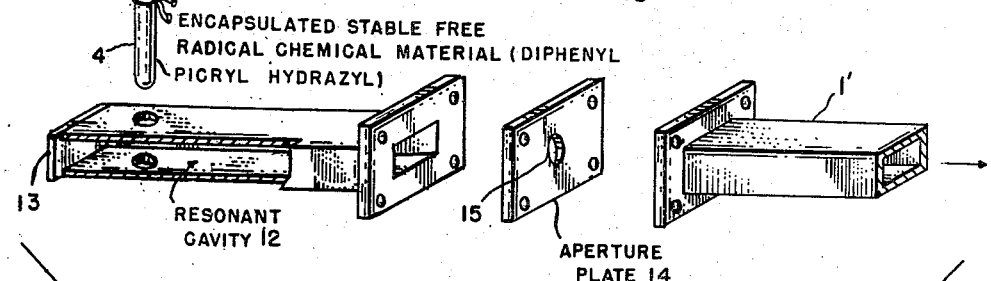

The various objects and features of the invention will be better understood from the following complete description thereof when read in conjunction with the accompanying drawing in which:

Figure 1 is a perspective view of one embodiment of the modulation system of the invention, in which the encapsulated stable, free radical chemical material operating as the modulating element is inserted across the interior of a non-resonant, hollow-pipe waveguide structure propagating the microwave energy utilized as the carrier wave;

Figure 2 is a plan view of a second embodiment of the modulation system of the invention, in which the encapsulated stable free radical chemical material operating as the modulating element, is disposed across the interior of a resonant cavity fed from a waveguide structure propagating the microwave carrier. In this figure, a portion of the structure of the electromagnet utilized for applying the D.-C. magnetic field to this material is broken away to show more clearly one of the modulating coils used, the position of the encapsulated material in the resonant cavity and other details of the cavity including an end wall for reflecting the signal-modulated microwave carrier back through the waveguide structure to an associated horn antenna which will radiate it to a waveguide receiving system including a detector for demodulating the signals from the carrier;

Figure 3 is a side elevation of a portion of the embodiment of Figure 2, showing the two modulating coils of the electromagnet, mounted on the core structure thereof, and the encapsulated free radical material inserted in the resonant cavity and disposed so that it extends through an air-gap in one leg of the core structure; and Figure 4 shows an exploded view of a portion of the embodiment of Figure 2, partially broken away, illustrating how the encapsulated free radical material, the tuned resonant cavity including the aperture plate and the reflecting end plate, and the associated waveguide line are assembled in the system.

In the embodiment of Figure 1, a non-resonant section 1 of hollow pipe waveguide of rectangular cross section of any desired dimensions (say, 1" x ½"), is utilized for propagating the microwave energy supplied to that guide near one end thereof from a microwave source 2, which may be, for example, a klystron oscillator, in any suitable manner, longitudinally over that guide towards the horn type radiating antenna 3.

A small amount of a stable free radical type of paramagnetic chemical compound, such as diphenyl picryl hydrazyl, is encapsulated with a dielectric material suitable as a binder (the dielectric constant of which is not critical) in a container made from any material, such as glass, which is transparent to microwave energy, to provide an encapsulated structure 4 of any desired shape, such as cylindrical, this structure being used as the modulating element of the system. Alternatively, the container may be eliminated and the stable free radical chemical compound and the dielectric binding material may be briquetted into the desired shape.

The entire encapsulated structure 4 is mounted in any suitable manner so that it extends transversely across the interior of the waveguide 1 at a centrally located point, in a direction perpendicular to the long side of its rectangular cross-section, at some point in that guide intermediate the point of connection thereto of the microwave source 2 and the horn type antenna 3. A unidirectional magnetic field is impressed on the free radical chemical material in the structure 4 in a direction perpendicular to the propagation direction of the microwave energy in waveguide 1, by any convenient means, for example, as shown by an electromagnet E. The electromagnet E, as illustrated, may include a magnetic core structure 5 of horseshoe shape partially surrounding the waveguide 1, made from a magnetizable material, such as iron, and having two vertical core legs one of which has an air-gap therein and the other of which is solid and has a magnet coil 6 wound thereon. The magnet coil 6 is supplied with direct current from a variable source 7 which may comprise a direct current battery 8 and an associated potentiometer 9, as shown. The waveguide 1 extends longitudinally through the air-gap in one leg of the core 5 of the electromagnet E, which is so positioned along the guide that the encapsulated structure 4 extending across the interior of the guide is disposed vertically between the pole pieces on opposite sides of the air-gap in one vertical leg of core structure 5. Two other magnet coils 10 and 11, serving as modulating coils, respectively wound on the portions of the vertical leg of the core 5, directly above and below the pole pieces on opposite sides of the air-gap in that leg, are connected in series across a source of sinusoidally alternating signals comprising a band of low frequencies, to be modulated on the microwave carrier.

The magnet coil 6 wound on the solid leg of the core structure 5 of electromagnet E is proportioned, and the elements of the associated direct circuit source 7 are selected and adjusted, so that the strength of the unidirectional (D.-C.) magnetic field applied to the structure 4 is such as to bring the free radical material therein to resonance at a frequency determined by the characteristics of this material and the order of the applied D.-C. field. Alternatively, a suitably designed permanent magnet may be utilized in place of the electromagnet E and associated D.-C. source 7, for producing the unidirectional magnetic field of the proper strength, applied to the encapsulated free radical material.

The varying amplitude modulating signals applied to the modulating coils 10 and 11 may comprise a wide band of low frequencies in the order of 10 c.p.s. to 15 kc. or more, such as would be provided by speech or other signals in the audio and adjacent frequency ranges. The sinusoidal alternating magnetic field superimposed by the modulating coils 10 and 11 on the initially constant D.-C. magnetic field will cause that field to be slightly modified in accordance with the instantaneous amplitude values of the modulating signals. This will correspondingly affect the spin velocity of the atomic nuclei of the paramagnetic free radical chemical material in the structure 4 so that the microwave impressed on that structure will be modulated therein with these signals. Tests made by the applicants on the embodiment of Fig. 1 in which the free radical material used in the structure 4 was diphenyl picryl hydrazyl, showed that the resulting modulation of the microwave carrier under optimum conditions was nearly 100 percent of full modulation.

The signal-modulated microwave carrier thus produced in the output of the encapsulated structure 4 will pass out over the waveguide 1 to the horn antenna 3 which will radiate it to a receiving station (not shown) where the low frequency audio modulating signal may be demodulated from the microwave carrier by means of a crystal or other conventional type of detector in well known manner.

The second embodiment of the modulation system of the invention, illustrated in Figs. 2, 3 and 4, differs essentially from that of Fig. 1 in that the encapsulated structure 4 containing a small amount of stable free radical type of paramagnetic chemical compound, such as diphenyl picryl hydrazyl, is mounted within a resonant cavity 12 fed with the microwave carrier from the source 2' through the section 1' of rectangular waveguide, instead of in a non-resonant waveguide structure. The resonant cavity 12, as shown, may be of rectangular cross-section, including at the one end a solid end plate 13 and at the other end an aperture plate 14 containing a centrally-located circular aperture 15, the two plates being separated by the distance $d$. The aperture 15 in plate 14 electrically couples the interior of the resonant cavity 12 with the interior of the waveguide section 1' allowing the microwave energy propagated over the latter to be transmitted into the cavity. The encapsulated structure 4 containing the free radical paramagnetic chemical compound extends across the interior of the cavity 12 at an intermediate point along its length in a direction perpendicular to the long side of the rectangular cross-section of the cavity. An initially constant D.-C. magnetic field is applied to the structure 4 in a direction perpendicular to the direction of propagation of the microwave energy through the cavity 12, by an electromagnet E including a magnetic core portion 5 partially surrounding the cavity and a magnet coil 6 wound on the solid vertical leg of the magnetic structure and supplied with direct current of the proper value from an associated direct circuit source 7, similar to the elements so designated in the embodiment of Fig. 1. However, the source of modulating signals comprising speech, audio or other low frequency signals to be modulated on the microwave carrier, in the embodiment of Figs. 2 to 4 is supplied across two coils 10' and 11' of the Helmholtz type in series, respectively mounted on the portions of the other vertical leg of the core structure 5 directly above and below the pole pieces located on opposite sides of the air-gap therein. The resonant cavity 12 is disposed within the air-gap of the core so that the encapsulated structure 4 extends across the interior of that cavity at a point between the two core pole pieces, as shown more clearly in Fig. 3. The strength of the constant unidirectional magnetic field applied to the structure 4 in this manner in the embodiment of Fig. 2 which was constructed and tested, was made approximately 2900 gauss in order to bring the stable free radical material (diphenyl picryl hydrazyl) in that structure to resonance at a frequency of approximately 9062 megacycles. This resonant frequency is mainly determined by the parameters of the resonant cavity 12. In a particular model of the embodiment of Fig. 2, which was constructed and tested, the resonant cavity 12 was made from 1" x ½" rectangular waveguide, and the distance $d$ between the end plate 13 and the aperture plate 14 was approximately 1.87 inches. The correct resonant frequency can be calculated from the formula $$\nu = \frac{eH}{2\pi} MC$$

where $\nu$ is the resonant frequency, $e$ is the charge on the electron in electrostatic units, $H$ is the field strength in gauss, $M$ is the mass of the proton (grams per centimeter) and $C$ is the velocity of light in meters per second.

The operation in the system of Fig. 2 of the encapsulated structure 4 including the stable free radical paramagnetic compound (diphenyl picryl hydrazyl) in providing efficient modulation of the microwave carrier with signals comprising a wide band of low frequencies, such as speech or other signals in the audio and adjacent frequency ranges, is similar to that of the similarly designated structure in the system of Fig. 1 as described above. The signal-modulated microwave energy appearing in the output of the structure 4 will be reflected from the end wall 13 of the resonant cavity 12 back through that cavity and the associated waveguide section 1' to the horn antenna 3' which will radiate it out to a receiver station 20 shown in which the modulating signals will be demodulated from the microwave carrier by a crystal or other conventional detector therein.

Although the particular free radical paramagnetic chemical compound used in the encapsulated structure 4 in the embodiments of the invention illustrated in Figs. 1 to 4 and described above was diphenyl picryl hydrazyl, which compound prepared in the usual manner is sufficiently stable for use as a modulator, other paramagnetic chemical materials such as Tri-P-Biphenyllamine or Di-P-Anisylamine, would be suitable for such use if they are prepared in such manner as to make them sufficiently stable. Other modifications of the modulation systems illustrated in the drawing and described above which are within the spirit and scope of the invention will occur to persons skilled in the art.

What is claimed is:

1. A system for producing efficient modulation of a high frequency carrier wave by varying amplitude signals consisting of a wide band of low frequency components comprising: a hollow pipe waveguide over which the carrier wave is propagated longitudinally; a modulating element consisting of a small amount of a stable, free radical type of paramagnetic chemical compound having an atomic resonance absorption characteristic including a strong, sharp resonance absorption line at a particular wavelength, and a dielectric binding material encapsulated to form a unitary structure of a desired shape, said structure being mounted in said waveguide so that it extends transversely across the interior thereof in the path of the propagated carrier wave; means to apply an initially constant, unidirectional magnetic field to said structure in a direction perpendicular to the propagation direction of the carrier wave and of such strength as to bring said compound to resonance at said particular wavelength; and means to superimpose a sinusoidally alternating magnetic field varying in accordance with the instantaneous amplitudes of said low frequency signal components on the unidirectional magnetic field to proportionally vary the total magnetic field and thus to amplitude modulate the carrier wave with said varying amplitude signals due to the effects thereby produced in the spin velocities of the atomic nuclei of the paramagnetic compound.

2. A system for efficiently modulating a microwave carrier with varying amplitude signals consisting of a wide band of audio frequency components, comprising: a hollow pipe waveguide system and a resonant cavity therein, over which the microwave carrier is propagated longitudinally; a modulating element consisting of a small amount of the stable free radical paramagnetic chemical compound, diphenyl picryl hydrazyl, and a dielectric binding material encapsulated to form a unitary structure of a desired shape, said structure being mounted within said resonant cavity so that it extends transversely across the interior thereof in the path of the propagated microwave carrier, said compound having an atomic resonance spectrum including a strong, sharp resonance absorption line at a given wavelength; means external to said resonant cavity for applying an initially constant, unidirectional magnetic field to said structure in a direction perpendicular to the propagation direction of the microwave carrier and of such strength as to bring the diphenyl picryl hydrazyl compound therein to resonance at said given wavelength which is mainly determined by the parameters of said resonant cavity at a prescribed frequency; and means to superimpose a sinusoidally alternating magnetic field varying in accordance with the instantaneous amplitudes of said audio frequency signals on said unidirectional magnetic field, to correspondingly vary the latter field and thus to amplitude modulate said microwave carrier with said varying amplitude signals in transmission through said cavity, due to the effects on the spin velocity of the atomic nuclei in said paramagnetic compound produced by the superimposed modulating alternating magnetic field.

3. The modulating system of claim 2, in which said resonant cavity includes a solid end plate for reflecting the signal-modulated microwave carrier produced by said modulating element back over a transmission path including the waveguide system to a receiving point, and a detector is employed at the receiving point to demodulate the signals from the microwave carrier.

References Cited in the file of this patent

UNITED STATES PATENTS

| | | |
|---|---|---|
| 2,645,758 | Van de Lindt | July 14, 1953 |
| 2,671,884 | Zaleski | Mar. 9, 1954 |
| 2,728,050 | Van de Lindt | Dec. 20, 1955 |
| 2,752,559 | Lipkin | June 26, 1956 |
| 2,762,871 | Dicke | Sept. 11, 1956 |
| 2,820,200 | Du Pre | Jan. 14, 1958 |
| 2,894,209 | Chodorow et al. | July 7, 1959 |

OTHER REFERENCES

Recording of Microwave Paramagnetic Resonance Spectra, The Review of Scientific Instruments, February 1952, pp. 75–77.

Electron Spin Resonance Absorption in Metals I Experimental, Physical Review, Apr. 15, 1955, pp. 337, 338 and 347.